(12) United States Patent
Lee et al.

(10) Patent No.: US 8,705,612 B2
(45) Date of Patent: Apr. 22, 2014

(54) METHOD FOR GENERATING DOWNLINK SIGNAL IN DOWNLINK MIMO SYSTEM

(75) Inventors: Moon Il Lee, Anyang-si (KR); Wook Bong Lee, Anyang-si (KR); Ja Ho Koo, Anyang-si (KR); Hyun Soo Ko, Anyang-si (KR); Jae Hoon Chung, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 18 days.

(21) Appl. No.: 13/202,563

(22) PCT Filed: Feb. 22, 2010

(86) PCT No.: PCT/KR2010/001072
§ 371 (c)(1),
(2), (4) Date: Aug. 19, 2011

(87) PCT Pub. No.: WO2010/095900
PCT Pub. Date: Aug. 26, 2010

(65) Prior Publication Data
US 2011/0305289 A1 Dec. 15, 2011

Related U.S. Application Data

(60) Provisional application No. 61/154,418, filed on Feb. 22, 2009.

(30) Foreign Application Priority Data
Feb. 19, 2010 (KR) .......................... 10-2010-0015216

(51) Int. Cl.
*H04B 1/66* (2006.01)

(52) U.S. Cl.
USPC ........... 375/240; 375/267; 375/299; 375/346; 370/319; 370/334; 370/344; 370/337; 370/335

(58) Field of Classification Search
CPC .................... H01L 25/0391; H01L 25/03929; H04J 11/00; H03M 13/6525
USPC ............. 375/240.02, 267, 299, 346; 370/319, 370/334, 344, 437, 335
See application file for complete search history.

(56) References Cited

U.S. PATENT DOCUMENTS 8,218,663 B2 * 7/2012 Muharemovic et al. ...... 375/260
8,259,643 B2 * 9/2012 Nam et al. .................... 370/319

(Continued)

FOREIGN PATENT DOCUMENTS

| KR | 1020050009583 | 1/2005 |
| KR | 1020090013220 | 2/2009 |

*Primary Examiner* — Sam K Ahn
*Assistant Examiner* — Fabricio R Murillo Garcia
(74) *Attorney, Agent, or Firm* — Lee, Hong, Degerman, Kang & Waimey

(57) ABSTRACT

A method for generating a downlink signal in a downlink MIMO (Multiple Input Multiple Output) comprises the steps of: mapping at least one transport block to at least one codeword; mapping at least one layer to each codeword; classifying at least one layer mapped to each codeword into a certain number of layer groups and performing layer permutation by the layer groups; and generating an OFDM (Orthogonal Frequency-Division Multiplexing) symbol using a signal which is permutated by the layer groups. A CRC (Cyclic Redundancy Check) is attached by the layer groups.

6 Claims, 5 Drawing Sheets

(56) References Cited

U.S. PATENT DOCUMENTS

| | | |
|---|---|---|
| 2008/0039107 A1 | 2/2008 | Ma et al. |
| 2008/0063115 A1* | 3/2008 | Varadarajan et al. ......... 375/299 |
| 2008/0240274 A1 | 10/2008 | Han et al. |
| 2008/0273452 A1* | 11/2008 | Khan et al. .................... 370/203 |
| 2009/0304109 A1* | 12/2009 | Kotecha ........................ 375/299 |
| 2010/0039928 A1* | 2/2010 | Noh et al. ..................... 370/210 |

* cited by examiner

METHOD FOR GENERATING DOWNLINK SIGNAL IN DOWNLINK MIMO SYSTEM

CROSS-REFERENCE TO RELATED APPLICATIONS

This application is the National Stage filing under 35 U.S.C. 371 of International Application No. PCT/KR2010/001072, filed on Feb. 22, 2010, which claims the benefit of earlier filing date and right of priority to Korean Application No. 10-2010-0015216, filed on Feb. 19, 2010, and also claims the benefit of U.S. Provisional Application Ser. No. 61/154,418, filed on Feb. 22, 2009, the contents of which are all hereby incorporated by reference herein in their entirety.

TECHNICAL FIELD

The present invention relates to a wireless mobile communication system, and more particularly, to a method for generating a downlink signal in a downlink MIMO system.

BACKGROUND ART

In next generation multimedia mobile communication systems, which have been actively studied in recent years, there is a demand for a system capable of processing and transmitting a variety of information (e.g., video and radio data) in addition to the early-stage voice service. Also, a 3rd generation wireless communication system is followed by a 4th generation wireless communication which is currently being developed aiming at support of a high-speed data service of 1 gigabits per second (Gbps) in downlink and 500 megabits per second (Mbps) in uplink. Wireless communication systems are designed for the purpose of providing reliable communication to a plurality of users irrespective of users' locations and mobility. However, a wireless channel has an abnormal characteristic such as path loss, noise, fading due to multipath, inter-symbol interference (ISI), the Doppler effect due to mobility of a user equipment, etc. Therefore, various techniques have been developed to overcome the abnormal characteristic of the wireless channel and to increase reliability of wireless communication.

Examples of techniques for supporting reliable high-speed data services include Orthogonal Frequency Division Multiplexing (OFDM), Multiple Input Multiple Output (MIMO), etc.

An OFDM system capable of reducing an inter-symbol interference effect with a low complexity is taken into consideration as one of post-3rd generation wireless communication systems. In the OFDM, serially input data symbols are converted into N parallel data symbols, and are then transmitted by being carried in N separate subcarriers. The subcarriers maintain orthogonality in a frequency dimension.

The MIMO technique improves data transmission/reception efficiency by using multiple transmitting antennas and multiple receiving antennas. Examples of the MIMO technique include spatial multiplexing, transmit diversity, beamforming, etc. A MIMO channel matrix depending on the number of receiving antennas and the number of transmitting antennas can be decomposed into a plurality of independent channels. Each of the independent channels is referred to as a layer or a stream. The number of layers is referred to as a rank.

The existing MIMO system is designed based on a structure of multiple codewords (CW). In the structure of multiple codewords, maximum two codewords are transmitted at the same time. Since each codeword has its hybrid automatic repeat request (HARQ) process, new data indicator (NDI), and modulation and coding scheme (MCS), separate control signaling is required.

FIG. 1 is a diagram illustrating a downlink MIMO structure in an existing system. In FIG. 1, two transport blocks (TB) are mapped into two codewords by a transport block to codeword mapping rule. This mapping rule can be configured as illustrated in Table 1 below, in accordance with a swap flag.

TABLE 1

| Mapping of TB into CW | Swap flag | CW |
| --- | --- | --- |
| TB1 -> CW1TB2 -> CW2 | 0 | 2 |
| TB1 -> CW1TB1 -> CW2 | 1 | 2 |
| TB1 -> CW1 (TB2 represents '0' TB.) | 0 | 1 |
| TB2 -> CW1 (TB1 represents '0'B.) | 0 | 1 |

As illustrated in Table 1, a transport block may have a size of 0. If a size of a transport block is 0, the corresponding transport block is not mapped into a codeword.

In the existing MIMO system, each codeword can include maximum two layers, and two codewords can be transmitted at the same time. Each transport block can be transmitted through a random codeword by using a swap flag as illustrated in Table 1. Accordingly, acknowledgement/negative acknowledgement (ACK/NACK), HARQ process and NDI are tied into a transport block not a codeword.

FIG. 2 is a diagram illustrating a codeword to layer mapping relation according to the related art. As illustrated in FIG. 2, codewords can be mapped into layers in accordance with the number of ranks and the number of transmitting antennas. After the codewords are mapped into the layers, a MIMO process is performed.

The following Table 2 illustrates an example of layer to cordword mapping.

TABLE 2

|  | CW1 | CW2 |
| --- | --- | --- |
| Rank 1 | {1} | — |
| Rank 2 | {1} | {2} |
| Rank 3 | {1} | {2, 3} |
| Rank 4 | {1, 2} | {3, 4} |

In Table 2, numbers in parentheses represent layers.

If eight transmitting antennas are supported by improving the existing system, the number of transport blocks reaches two times of the existing system. Therefore, the existing single user (SU) MIMO structure cannot be extended to support eight transmitting antennas. Also, since transmission of maximum eight layers should be supported, a codeword to layer mapping rule should newly be designed.

DISCLOSURE

Technical Problem

An object of the present invention is to provide a method for generating a signal in a downlink MIMO system that supports eight transmitting antenna, and an apparatus for performing the method.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, a method for generating a downlink signal in a downlink multiple input multiple output (MIMO) system comprises the steps of mapping at least one transport block to at least once codeword; mapping at least one layer to each codeword; classifying the at least one layer mapped to each codeword into a certain number of layer groups and performing layer permutation for each of the layer groups; and generating an OFDM (orthogonal frequency division multiplexing) symbol using a signal which is permutated for each of the layer groups, wherein a cyclic redundancy check (CRC) is attached to each of the layer groups.

The number of the codewords is maximum 2, and the number of layers mapped to each codeword is maximum 4.

The at least one layer mapped to each layer is divided by maximum two layer groups.

A modulation and coding scheme (MCS) is set for each of the layer groups.

In another aspect of the present invention, a base station in a downlink multiple input multiple output (MIMO) system comprises a mapping module mapping at least one transport block to at least once codeword; a codeword to layer mapping module mapping at least one layer to each codeword; a layer permutation module classifying the at least one layer mapped to each codeword into a certain number of layer groups and performing layer permutation for each of the layer groups; and a symbol generator generating an OFDM (orthogonal frequency division multiplexing) symbol using a signal which is permutated for each of the layer groups, wherein a cyclic redundancy check (CRC) is attached to each of the layer groups.

The number of the codewords is maximum 2, and the number of layers mapped to each codeword is maximum 4.

The at least one layer mapped to each layer is divided by maximum two layer groups.

A modulation and coding scheme (MCS) is set for each of the layer groups.

Advantageous Effects

According to the embodiments of the present invention, codeword to layer mapping can be performed desirably in a downlink MIMO system that supports eight transmitting antennas, whereby system performance can be improved.

It will be appreciated by persons skilled in the art that that the effects that could be achieved with the present invention are not limited to what has been particularly described hereinabove and other advantages of the present invention will be more clearly understood from the following detailed description.

BEST MODE FOR CARRYING OUT THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, although the following description will be made based on some terminologies, the following description will not be limited to such terminologies and other terminologies may be designated as same meaning. Also, wherever possible, the same reference numbers will be used throughout the drawings to refer to the same or like parts.

Hereinafter, a method for generating a downlink signal in a MIMO system that supports eight transmitting antennas in accordance with the present invention will be described.

Figure 1:
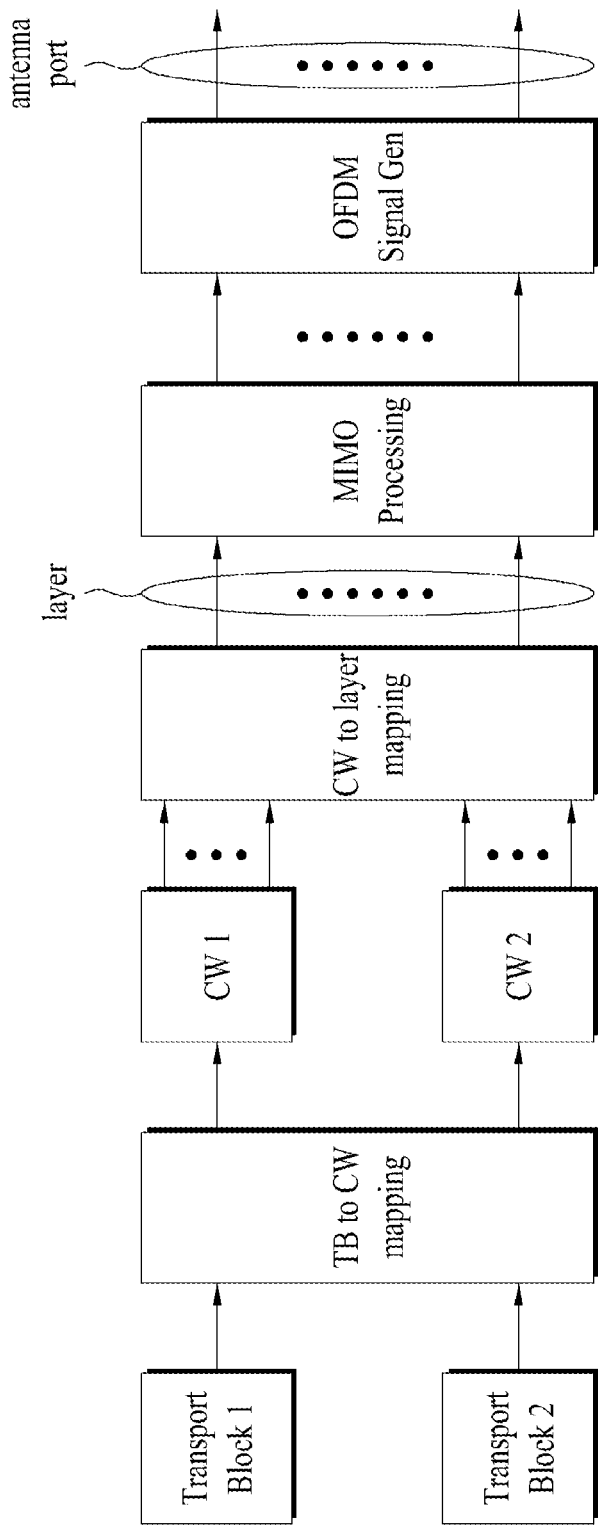
FIG. 1 is a diagram illustrating a downlink MIMO structure in an existing system.
Figure 2:
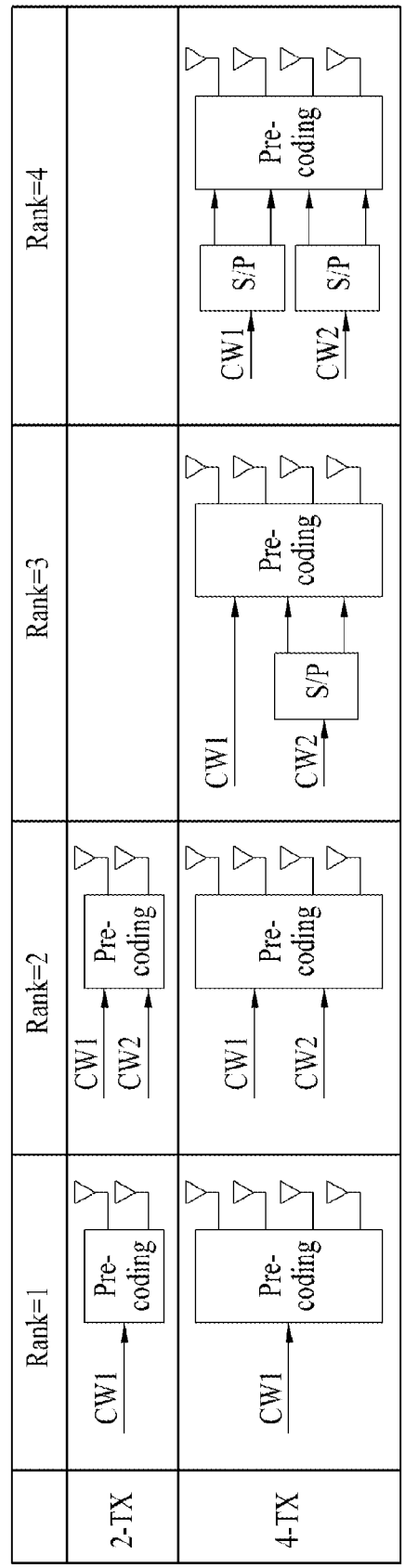
FIG. 2 is a diagram illustrating a codeword to layer mapping relation according to the related art.

The downlink MIMO structure illustrated in FIG. 1 can be extended to various types, and can be divided depending on the number of transport blocks, codewords, HARQ process, and MCS. Hereinafter, it is assumed that the HARQ process is tied into NDI, and all layers within one codeword have the same MCS.

Figure 3:
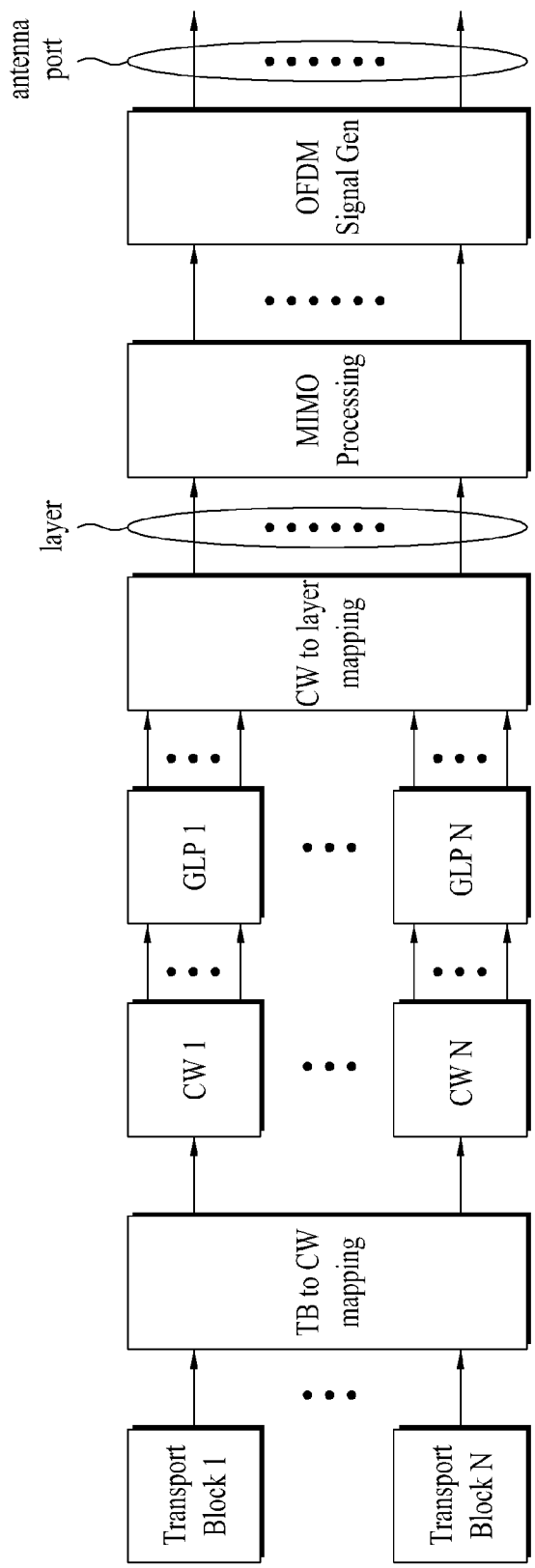
FIG. 3 is a diagram illustrating a concept of a downlink MIMO structure that includes group-level layer permutation (GLP) according to one embodiment of the present invention.

FIG. 3 is a diagram illustrating a concept of a downlink MIMO structure that includes group-level layer permutation (GLP) according to one embodiment of the present invention. Group level permutation is applied to the layers within the codeword, whereby diversity can be obtained for the layers within the group.

Since the GLP operation is dependent on a codeword to layer mapping rule, it can be performed after the codewords are mapped into the layers.

Figure 4:
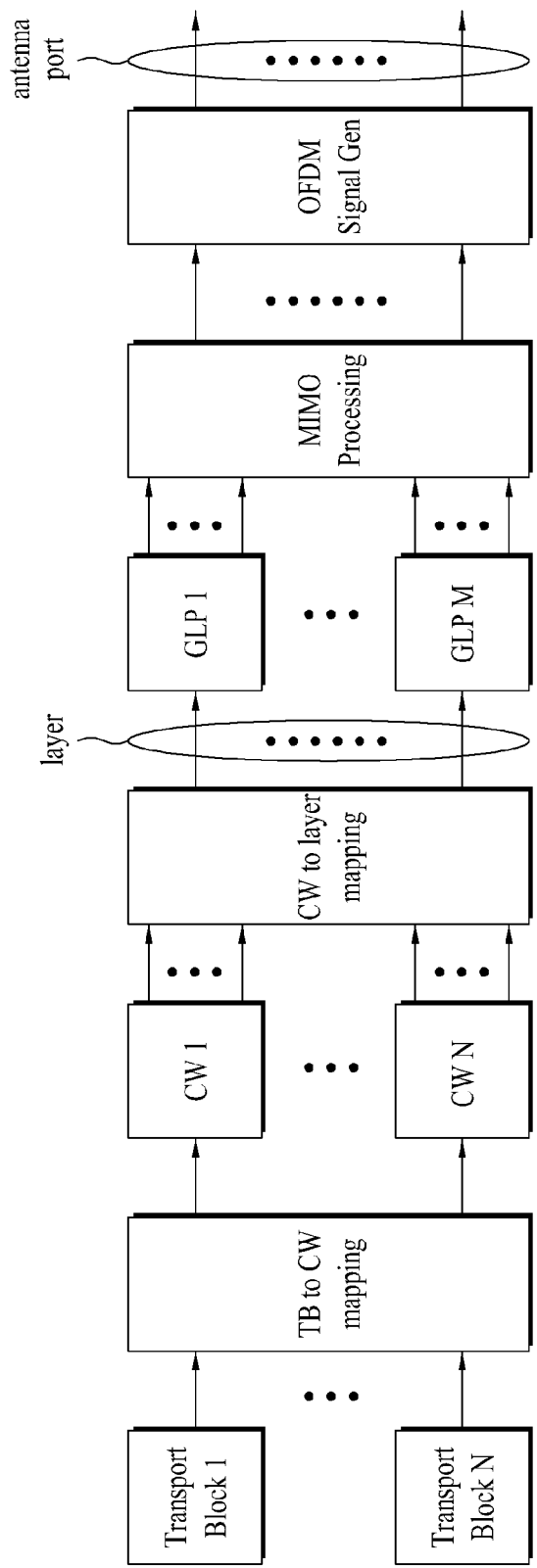
FIG. 4 is a diagram illustrating a concept of a downlink MIMO structure that includes group-level layer permutation (GLP) according to one embodiment of the present invention.

FIG. 4 is a diagram illustrating a concept of a downlink MIMO structure that includes group-level layer permutation (GLP) according to one embodiment of the present invention. The downlink MIMO structure of FIG. 4 has the same structure as that of FIG. 3 except for the location of GLP.

In FIG. 3 and FIG. 4, codewords and layers can be used for different users. If the structure is used for a plurality of users, N should be greater than the number of users scheduled at the same time.

Various schemes for mapping codewords into layers can be considered depending on the number of codewords. Supposing that maximum two codewords exist, the following Table 3 illustrates an example of mapping codewords into layers when the number of layers is less than 5.

TABLE 3

|        | CW1          | CW2           |
|--------|--------------|---------------|
| Rank 1 | {1}          | —             |
| Rank 2 | {1}          | {2}           |
| Rank 3 | {1}          | {2, 3}        |
| Rank 4 | {1, 2}       | {3, 4}        |
| Rank 5 | {1, 2}       | {3, 4, 5}     |
| Rank 6 | {1, 2, 3}    | {4, 5, 6}     |
| Rank 7 | {1, 2, 3}    | {4, 5, 6, 7}  |
| Rank 8 | {1, 2, 3, 4} | {5, 6, 7, 8}  |

In Table 3, codeword includes maximum four layers, and if the number of all codewords is an odd number, the number of layers of the first codeword CW1 is set to be smaller than the number of layers of the second codeword CW2.

In case of Table 3, since many layers are included in each codeword, four codewords can be considered as expressed by the following Table 4 to improve performance of a successive interference cancellation (SIC) receiver.

TABLE 4

|        | CW1    | CW2    | CW3    | CW4    |
|--------|--------|--------|--------|--------|
| Rank 1 | {1}    | —      | —      | —      |
| Rank 2 | {1}    | {1}    | —      | —      |
| Rank 3 | {1}    | {2, 3} | —      | —      |
| Rank 4 | {1, 2} | {3, 4} | —      | —      |
| Rank 5 | {1}    | {2, 3} | {4, 5} | —      |
| Rank 6 | {1, 2} | {3, 4} | {5, 6} | —      |
| Rank 7 | {1}    | {2, 3} | {4, 5} | {6, 7} |
| Rank 8 | {1, 2} | {3, 4} | {5, 6} | {7, 8} |

The above Table 4 illustrates a codeword to layer mapping rule when four codewords are applied to two transport blocks. In Table 4, it is important that each codeword can include maximum two layers and a codeword to layer mapping rule corresponding to rank 1 to rank 4 is the same as the existing system.

Since one to one mapping between transport blocks and codewords cannot be performed, a transport to codeword mapping can be configured as expressed by the following Table 5. Table 5 illustrates a codeword to layer mapping scheme for 8×8 transmission when four codewords can be supported.

TABLE 5

|        | CW1 | CW2 | CW3 | CW4 |
|--------|-----|-----|-----|-----|
| Rank 1 | TB1 | —   | —   | —   |
| Rank 2 | TB1 | TB2 | —   | —   |
| Rank 3 | TB1 | TB2 | —   | —   |
| Rank 4 | TB1 | TB2 | —   | —   |
| Rank 5 | TB1 | TB1 | TB2 | —   |
| Rank 6 | TB1 | TB1 | TB2 | —   |
| Rank 7 | TB1 | TB1 | TB2 | TB2 |
| Rank 8 | TB1 | TB1 | TB2 | TB2 |

When the rank is less than 5 in the above Table 5, the transport block to codeword mapping rule of the Table 1 can be applied to the mapping rule of the Table 5. When swapping is not active, if rank is greater than 4, CW1 and CW2 are mapped into TB1, and the other codewords CW3 and CW4 are mapped into TB2.

If a swap flag is used, the location of the transport blocks can be changed. Also, partial swapping can be performed. For example, CW1 and CW3 can be used to transmit TB1 and the other codewords CW1 and CW4 can be used for TB2, and vice versa.

A codeword can include one or more layers. This means that the number of codewords is smaller than or equal to the number of layers. Each codeword or each layer can include its eigen cyclic redundancy check (CRC) to check an error. Also, CRC can be attached to every two layers to maintain the existing codeword to layer mapping structure.

The following Table 6 illustrates an example of attaching CRC to each codeword per rank according to one embodiment of the present invention.

TABLE 6

|        | CW1                | CW2                 |
|--------|--------------------|---------------------|
| Rank 1 | {1} + CRC          | —                   |
| Rank 2 | {1} + CRC          | {2} + CRC           |
| Rank 3 | {1} + CRC          | {2, 3} + CRC        |
| Rank 4 | {1, 2} + CRC       | {3, 4} + CRC        |
| Rank 5 | {1, 2} + CRC       | {3, 4, 5} + CRC     |
| Rank 6 | {1, 2, 3} + CRC    | {4, 5, 6} + CRC     |
| Rank 7 | {1, 2, 3} + CRC    | {4, 5, 6, 7} + CRC  |
| Rank 8 | {1, 2, 3, 4} + CRC | {5, 6, 7, 8} + CRC  |

In order to improve layer cancellation performance, each layer can include its CRC. The following Table 7 illustrates an example of attaching CRC to each layer in case of two codewords per rank according to one embodiment of the present invention.

TABLE 7

|        | CW1                                        | CW2                                             |
|--------|--------------------------------------------|-------------------------------------------------|
| Rank 1 | $\{1\} + CRC_1$                            | —                                               |
| Rank 2 | $\{1\} + CRC_1$                            | $\{2\} + CRC_2$                                 |
| Rank 3 | $\{1\} + CRC_1$                            | $\{2, 3\} + CRC_2, CRC_3$                       |
| Rank 4 | $\{1, 2\} + CRC_1$                         | $\{3, 4\} + CRC_3 CRC_4$                        |
| Rank 5 | $\{1, 2\} + CRC_1, CRC_2$                  | $\{3, 4, 5\} + CRC_3, CRC_4, CRC_5$             |
| Rank 6 | $\{1, 2, 3\} + CRC_1, CRC_2, CRC_3$        | $\{4, 5, 6\} + CRC_4, CRC_5, CRC_6$             |
| Rank 7 | $\{1, 2, 3\} + CRC_1, CRC_2, CRC_3$        | $\{4, 5, 6, 7\} + CRC_4, CRC_5, CRC_6, CRC_7$   |
| Rank 8 | $\{1, 2, 3, 4\} + CRC_1, CRC_2, CRC_3, CRC_4$ | $\{5, 6, 7, 8\} + CRC_5, CRC_6, CRC_7, CRC_8$ |

In Table 7, CRC is attached to each layer, and if a small amount of resources are allocated to the user equipment, this may cause excessive CRC overhead.

Accordingly, considering the above problem of overhead, it is considered that CRC is attached at a group level. The following Table 8 illustrates an example of attaching CRC at a group level in case of two codewords according to one embodiment of the present invention.

TABLE 8

|        | CW1                              | CW2                              |
|--------|----------------------------------|----------------------------------|
| Rank 1 | $\{1\} + CRC_1$                  | —                                |
| Rank 2 | $\{1\} + CRC_1$                  | $\{2\} + CRC_2$                  |
| Rank 3 | $\{1\} + CRC_1$                  | $\{2, 3\} + CRC_2$               |
| Rank 4 | $\{1, 2\} + CRC_1$               | $\{3, 4\} + CRC_2$               |
| Rank 5 | $\{1, 2\} + CRC_1$               | $\{3, 4\} + CRC_2, \{5\} + CRC_3$ |
| Rank 6 | $\{1, 2\} + CRC_1, \{3\} + CRC_2$ | $\{4, 5\} + CRC_3, \{6\} + CRC_4$ |
| Rank 7 | $\{1, 2\} + CRC_1, \{3\} + CRC_2$ | $\{4, 5\} + CRC_3, \{6, 7\} + CRC_4$ |
| Rank 8 | $\{1, 2\} + CRC_1, \{3, 4\} + CRC_2$ | $\{5, 6\} + CRC_3, \{7, 8\} + CRC_4$ |

In Table 8, it is important that layers included in each codeword are divided into two layer groups if each codeword includes three or more layers, wherein each group includes maximum two layers. Also, each layer group has its CRC.

The number of layers included in the first layer group and the second layer group may be set differently from the above Table 8. Also, MCS may be applied to each layer group included in the codeword.

Group level permutation (GLP) may be varied depending on the number of layers included in one codeword. GLP can be expressed as a permutation matrix. The GLP matrix can be applied to each codeword, and can be varied depending on the number of layers per codeword. For example, if a rank is 5 in the above Table 8, a 2-layer GLP matrix is applied to the first codeword, and a 3-layer GLP matrix is applied to the second codeword. The following Table 9 illustrates an example of a GLP matrix depending on the number of layers according to one embodiment of the present invention.

TABLE 9

| | Permutation matrix 1 | Permutation matrix 2 |
|---|---|---|
| 1-layer | $[1]$ | $[1]$ |
| 2-layer | $\begin{bmatrix} 0 & 1 \\ 1 & 0 \end{bmatrix}^k$ | $\begin{bmatrix} 1 & 0 \\ 0 & e^{j\theta_1 k} \end{bmatrix} \mathrm{DFT}_{2\times 2}$ |
| 3-layer | $\begin{bmatrix} 0 & 1 & 0 \\ 0 & 0 & 1 \\ 1 & 0 & 0 \end{bmatrix}^k$ | $\begin{bmatrix} 1 & 0 & 0 \\ 0 & e^{j\theta_1 k} & 0 \\ 0 & 0 & e^{j\theta_2 k} \end{bmatrix} \mathrm{DFT}_{3\times 3}$ |
| | or | |
| | $\begin{bmatrix} 0 & 0 & 1 \\ 1 & 0 & 0 \\ 0 & 1 & 0 \end{bmatrix}^k$ | |
| 4-layer | $\begin{bmatrix} 0 & 1 & 0 & 0 \\ 0 & 0 & 1 & 0 \\ 0 & 0 & 0 & 1 \\ 1 & 0 & 0 & 0 \end{bmatrix}^k$ | $\begin{bmatrix} 1 & 0 & 0 & 0 \\ 0 & e^{j\theta_1 k} & 0 & 0 \\ 0 & 0 & e^{j\theta_2 k} & 1 \\ 0 & 0 & 0 & e^{j\theta_3 k} \end{bmatrix} \mathrm{DFT}_{4\times 4}$ |
| | or | |
| | $\begin{bmatrix} 0 & 0 & 1 & 0 \\ 0 & 0 & 0 & 1 \\ 1 & 0 & 0 & 0 \\ 0 & 1 & 0 & 0 \end{bmatrix}^k$ | |

In the above Table 9, k represents a resource index such as a virtual resource index, a subcarrier index in one OFDM symbol, or an OFDM symbol index within one subframe. However, k is not needed to be limited to index. GLP is characterized in that group level permutation is applied to layers and different layers included in different codewords are not permuted within one subframe or one OFDM symbol. Also, permutation can become active per I index as illustrated in Table 10 below.

TABLE 10

| | Permutation matrix 1 | Permutation matrix 2 |
|---|---|---|
| 1-layer | $[1]$ | $[1]$ |
| 2-layer | $\begin{bmatrix} 0 & 1 \\ 1 & 0 \end{bmatrix}^{\lfloor \frac{k}{l} \rfloor}$ | $\begin{bmatrix} 1 & 0 \\ 0 & e^{j\theta_1 \lfloor \frac{k}{l} \rfloor} \end{bmatrix} \mathrm{DFT}_{2\times 2}$ |

TABLE 10-continued

| | Permutation matrix 1 | Permutation matrix 2 |
|---|---|---|
| 3-layer | $\begin{bmatrix} 0 & 1 & 0 \\ 0 & 0 & 1 \\ 1 & 0 & 0 \end{bmatrix}^{\lfloor \frac{k}{l} \rfloor}$ | $\begin{bmatrix} 1 & 0 & 0 \\ 0 & e^{j\theta_1 \lfloor \frac{k}{l} \rfloor} & 0 \\ 0 & 0 & e^{j\theta_2 \lfloor \frac{k}{l} \rfloor} \end{bmatrix} \mathrm{DFT}_{3\times 3}$ |
| | or | |
| | $\begin{bmatrix} 0 & 0 & 1 \\ 1 & 0 & 0 \\ 0 & 1 & 0 \end{bmatrix}^{\lfloor \frac{k}{l} \rfloor}$ | |
| 4-layer | $\begin{bmatrix} 0 & 1 & 0 & 0 \\ 0 & 0 & 1 & 0 \\ 0 & 0 & 0 & 1 \\ 1 & 0 & 0 & 0 \end{bmatrix}^{\lfloor \frac{k}{l} \rfloor}$ | $\begin{bmatrix} 1 & 0 & 0 & 0 \\ 0 & e^{j\theta_1 \lfloor \frac{k}{l} \rfloor} & 0 & 0 \\ 0 & 0 & e^{j\theta_2 \lfloor \frac{k}{l} \rfloor} & 1 \\ 0 & 0 & 0 & e^{j\theta_3 \lfloor \frac{k}{l} \rfloor} \end{bmatrix} \mathrm{DFT}_{4\times 4}$ |
| | or | |
| | $\begin{bmatrix} 0 & 0 & 1 & 0 \\ 0 & 0 & 0 & 1 \\ 1 & 0 & 0 & 0 \\ 0 & 1 & 0 & 0 \end{bmatrix}^{\lfloor \frac{k}{l} \rfloor}$ | |

In the above Table 9, $\theta_i$, i=1, 2, 3 and $\mathrm{DFT}_{N\times N}$ respectively represent a phase shaft angle and an N×N DFT matrix.

The permutation can be used only in case of retransmission so as not to increase complexity of a receiver. In such case, the index k may be the number of retransmission times. Also, the GLP matrix can be used for a specific transport block. For example, in a specific TB or CW, the value of k is set to 0, whereby the GLP matrix can be of no effect.

Figure 5:
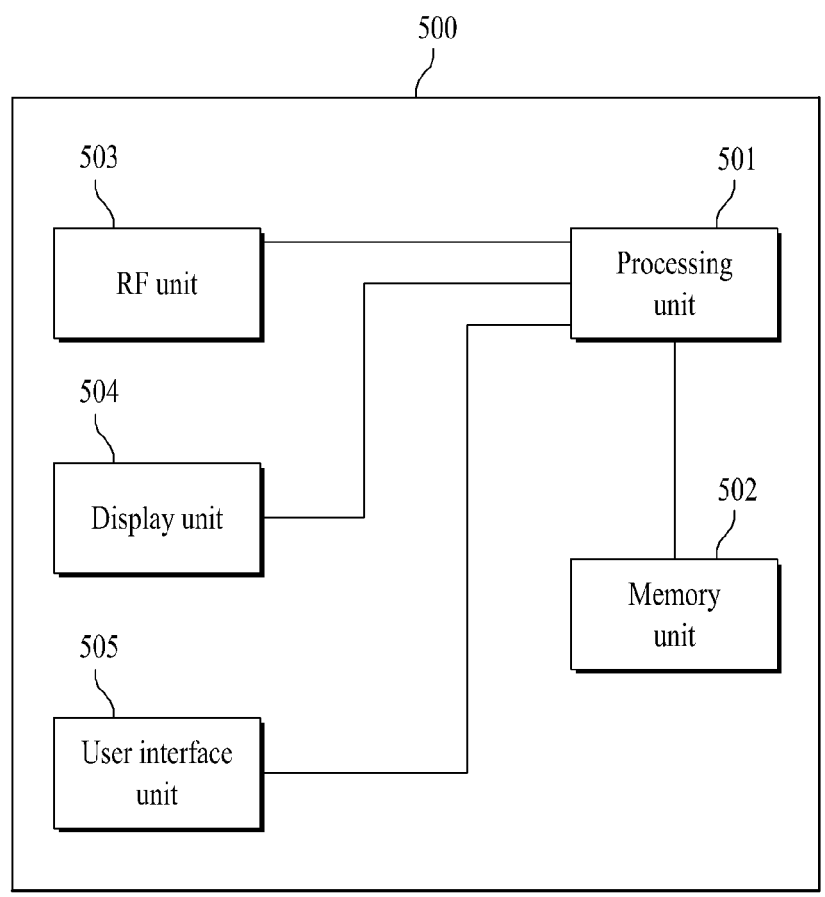
FIG. 5 is a block diagram illustrating a structure of a device that can be applied to a user equipment or a base station and can perform the present invention.

FIG. 5 is a block diagram illustrating a device that can be applied to a user equipment or a base station and can perform the present invention. The aforementioned codeword to layer mapping method can be performed by the device illustrated in FIG. 5. As illustrated in FIG. 5, a device 500 includes a processing unit 501, a memory unit 502, a radio frequency (RF) unit 503, a display unit 504 and a user interface unit 505. Layers of a physical interface protocol are implemented by the processing unit 501. The processing unit 501 provides a control plane and a user plane. A function of each layer can be implemented by the processing unit 501. The memory unit 502 is connected with the processing unit 501 and stores an operating system, an application program, and general files therein. If the device 500 is a user equipment (UE), the display unit 504 can display various kinds of information, and can be implemented using LCD (Liquid Crystal Display), OLED (Organic Light Emitting Diode), etc., which are known. The user interface unit 505 can be configured by combination of well known user interfaces such as key pad and touch screen. The RF unit 503 is electrically connected with the processing unit 501 and transmits or receives a radio signal.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention can be implemented by various means, for example, hardware, firmware, software, or their combination. If the embodiments according to the present invention are implemented by hardware, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the embodiments of the present invention can be implemented by a type of a module, a procedure, or a function, which performs functions or operations described as above. For example, a software code may be stored in a memory unit and then may be driven by a processor. The memory unit may be located inside or outside the processor to transmit and receive data to and from the processor through various means which are well known.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The present invention can be applied to a user equipment, a base station or other equipment of a wireless mobile communication system.

The invention claimed is:

1. A method for generating a downlink signal at a base station in a downlink multiple input multiple output (MIMO) system, the method comprising:

mapping, by the base station, two codewords to a plurality of layers including layer 1, layer 2, layer 3, layer 4, layer 5, layer 6, layer 7, and layer 8, classifying the plurality of layers into a plurality of layer groups as shown in Table 1, and attaching a cyclic redundancy check (CRC) code to each of the plurality of layer groups according to the following Table 1 such that each layer group has its CRC code,

TABLE 1

|  | Codeword 1 | Codeword 2 |
|---|---|---|
| Rank 5 | {layer 1, layer 2} + CRC | {layer 3, layer 4} + CRC, {layer 5} + CRC |
| Rank 6 | {layer 1, layer 2} + CRC, {layer 3} + CRC | {layer 4, layer 5} + CRC, {layer 6} + CRC |
| Rank 7 | {layer 1, layer 2} + CRC, {layer 3} + CRC | {layer 4, layer 5} + CRC, {layer 6, layer 7} + CRC |
| Rank 8 | {layer 1, layer 2} + CRC, {layer 3, layer 4} + CRC | {layer 5, layer 6} + CRC, {layer 7, layer 8} + CRC; | performing, by the base station, layer permutation within a codeword among the two codewords shown in Table 1 according to the following Table 2 when the codeword is for retransmission,

TABLE 2

| | Permutation Matrix |
|---|---|
| 2-layers | $\begin{pmatrix} 1 & 0 \\ 0 & e^{j\theta_1 \lfloor \frac{k}{l} \rfloor} \end{pmatrix} DFT_{2\times 2}$ |
| 3-layers | $\begin{pmatrix} 1 & 0 & 0 \\ 0 & e^{j\theta_1 \lfloor \frac{k}{l} \rfloor} & 0 \\ 0 & 0 & e^{j\theta_2 \lfloor \frac{k}{l} \rfloor} \end{pmatrix} DFT_{3\times 3}$ |
| 4-layers | $\begin{pmatrix} 1 & 0 & 0 & 0 \\ 0 & e^{j\theta_1 \lfloor \frac{k}{l} \rfloor} & 0 & 0 \\ 0 & 0 & e^{j\theta_2 \lfloor \frac{k}{l} \rfloor} & 0 \\ 0 & 0 & 0 & e^{j\theta_3 \lfloor \frac{k}{l} \rfloor} \end{pmatrix} DFT_{4\times 4}$, | where k is a subcarrier index, l is an orthogonal frequency division multiplexing (OFDM) symbol index, $\theta_i$ (i=1, 2, 3) is a phase shift angle and $DFT_{N*N}$ is an N*N discrete Fourier transform (DFT) matrix where N is an integer, wherein 2-layers, 3-layers, and 4-layers in Table 2 represent a total number of layers included within the codeword; and generating, by the base station, an OFDM symbol using the permutated layers.

2. The method according to claim 1, wherein each of the plurality of layer groups is modulated and coded with a same modulation and coding scheme (MCS).

3. The method according to claim 1, wherein a layer of the codeword is not permuted with a layer of another codeword in a subframe or an OFDM symbol.

4. In a downlink multiple input multiple output (MIMO) system, a base station comprising:

a codeword to layer mapping module configured to map two codewords to a plurality of layers including layer 1, layer 2, layer 3, layer 4, layer 5, layer 6, layer 7, and layer 8 according to the following Table 1;

a layer permutation module configured to:

classify the plurality of layers into a plurality of layer groups according to the following Table 1;

attach a cyclic redundancy check (CRC) code to each of the plurality of layer groups according to the following Table 1 such that each layer group has its CRC code,

TABLE 1

|  | Codeword 1 | Codeword 2 |
|---|---|---|
| Rank 5 | {layer 1, layer 2} + CRC | {layer 3, layer 4} + CRC, {layer 5} + CRC |
| Rank 6 | {layer 1, layer 2} + CRC, {layer 3} + CRC | {layer 4, layer 5} + CRC, {layer 6} + CRC |
| Rank 7 | {layer 1, layer 2} + CRC, {layer 3} + CRC | {layer 4, layer 5} + CRC, {layer 6, layer 7} + CRC |
| Rank 8 | {layer 1, layer 2} + CRC, {layer 3, layer 4} + CRC | {layer 5, layer 6} + CRC, {layer 7, layer 8} + CRC; | and perform layer permutation within a codeword among the two codewords according to the following Table 2 when the codeword is for retransmission,

TABLE 2

| | Permutation Matrix |
|---|---|
| 2-layers | $\begin{pmatrix} 1 & 0 \\ 0 & e^{j\theta_1 \lfloor \frac{k}{l} \rfloor} \end{pmatrix} \text{DFT}_{2\times 2}$ |
| 3-layers | $\begin{pmatrix} 1 & 0 & 0 \\ 0 & e^{j\theta_1 \lfloor \frac{k}{l} \rfloor} & 0 \\ 0 & 0 & e^{j\theta_2 \lfloor \frac{k}{l} \rfloor} \end{pmatrix} \text{DFT}_{3\times 3}$ |
| 4-layers | $\begin{pmatrix} 1 & 0 & 0 & 0 \\ 0 & e^{j\theta_1 \lfloor \frac{k}{l} \rfloor} & 0 & 0 \\ 0 & 0 & e^{j\theta_2 \lfloor \frac{k}{l} \rfloor} & 0 \\ 0 & 0 & 0 & e^{j\theta_3 \lfloor \frac{k}{l} \rfloor} \end{pmatrix} \text{DFT}_{4\times 4}$, | where k is a resource index, l is an orthogonal frequency division multiplexing (OFDM) symbol index, $\theta_i$ (i=1, 2, 3) is a phase shift angle and $\text{DFT}_{N*N}$ is an N*N discrete Fourier transform (DFT) matrix where N is an integer, wherein 2-layers, 3-layers, and 4-layers in Table 2 represent a total number of layers included within the codeword; and a symbol generator configured to generate an OFDM symbol using the permutated layers.

5. The base station according to claim 4, wherein each of the plurality of layer groups is modulated and coded with a same modulation and coding scheme (MCS).

6. The base station according to claim 4, wherein a layer of the codeword is not permuted with a layer of another codeword in a subframe or an OFDM symbol.

\* \* \* \* \*